United States Patent
Nair et al.

(10) Patent No.: US 11,549,213 B2
(45) Date of Patent: *Jan. 10, 2023

(54) METHOD FOR MAKING LAMINATED LIGHT-BLOCKING DECORATIVE ARTICLE

(71) Applicant: Eastman Kodak Company, Rochester, NY (US)

(72) Inventors: Mridula Nair, Penfield, NY (US); Diane Marie Herrick, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 16/720,041

(22) Filed: Dec. 19, 2019

(65) Prior Publication Data

US 2021/0189641 A1 Jun. 24, 2021

(51) Int. Cl.
D06M 23/04 (2006.01)
C09D 5/02 (2006.01)
C09D 101/02 (2006.01)
C09D 167/00 (2006.01)
A47H 23/08 (2006.01)
C09D 125/06 (2006.01)
G02B 5/00 (2006.01)

(52) U.S. Cl.
CPC ............ *D06M 23/04* (2013.01); *A47H 23/08* (2013.01); *C09D 5/024* (2013.01); *C09D 101/02* (2013.01); *C09D 125/06* (2013.01); *C09D 167/00* (2013.01); *D06M 2200/01* (2013.01); *D06M 2200/30* (2013.01); *G02B 5/003* (2013.01)

(58) Field of Classification Search
CPC combination set(s) only.
See application file for complete search history.

(56) References Cited

U.S. PATENT DOCUMENTS

| | | |
|---|---|---|
| 3,527,654 A | 9/1970 | Jones et al. |
| 3,567,565 A | 3/1971 | Jones et al. |
| 3,607,341 A | 9/1971 | Goins et al. |
| 3,615,970 A | 10/1971 | May |
| 3,616,005 A | 10/1971 | Wetstone |
| 3,748,217 A | 7/1973 | May et al. |
| 3,901,240 A | 8/1975 | Hoey |
| 4,039,709 A | 8/1977 | Newman |
| 4,329,386 A | 5/1982 | Samowich |
| 4,409,275 A | 10/1983 | Samowich |
| 4,677,016 A | 6/1987 | Ferziger et al. |
| 4,830,897 A | 5/1989 | Lichtenstein |
| 5,132,163 A | 7/1992 | Leaderman et al. |
| 5,283,111 A | 2/1994 | Schlecker |
| 5,741,582 A | 4/1998 | Leaderman et al. |
| 6,541,138 B2 | 4/2003 | Bullock et al. |
| 6,872,276 B2 | 3/2005 | Cherpinsky et al. |
| 6,884,491 B2 | 4/2005 | Rubin et al. |
| 10,942,300 B2 * | 3/2021 | Nair .................. A47H 23/10 |
| 11,181,247 B2 * | 11/2021 | Nair .................. B32B 5/024 |
| 11,275,203 B2 * | 3/2022 | Nair .................. E06B 9/24 |
| 2002/0122949 A1 | 9/2002 | Richards |
| 2004/0170800 A1 | 9/2004 | Richards |
| 2007/0105471 A1 | 5/2007 | Wang et al. |
| 2010/0066121 A1 | 3/2010 | Gross |
| 2015/0234098 A1 | 8/2015 | Lofftus et al. |
| 2016/0354804 A1 | 12/2016 | Brick et al. |
| 2016/0355660 A1 | 12/2016 | Brick et al. |
| 2017/0238476 A1 | 8/2017 | Parrein et al. |
| 2018/0051155 A1 | 2/2018 | Nair et al. |
| 2019/0263988 A1 | 8/2019 | Nair |
| 2021/0189641 A1 * | 6/2021 | Nair .................. C09D 101/02 |

* cited by examiner

*Primary Examiner* — Lynda Salvatore
(74) *Attorney, Agent, or Firm* — J. Lanny Tucker

(57) ABSTRACT

Laminated light-blocking decorative articles are prepared by applying an aqueous foamed opacifying composition to a non-woven fabric, drying, laminating a decorative fabric to the resulting dry foamed opacifying layer, and densifying that layer to have a thickness that is at least 20% less than before densifying. This operation can be carried out so that non-woven fabric, decorative fabric, and aqueous foamed opacifying composition are supplied in a single-pass, in-line operation to make any desired quantity of a laminated light-blocking decorative article. The applied aqueous foamed opacifying composition has 35%-70% solids and a foam density of 0.1-0.5 g/cm$^3$. It is composed of (a) porous particles, (b) a binder material, (c) two or more additives comprising at least one foaming surfactant and at least one foam stabilizer, (d) an aqueous medium, and (e) at least 0.0001 weight % of an opacifying colorant that absorbs electromagnetic radiation having a wavelength of 380-800 nm.

19 Claims, No Drawings

METHOD FOR MAKING LAMINATED LIGHT-BLOCKING DECORATIVE ARTICLE

RELATED APPLICATIONS

Reference is made to the following related applications:

U.S. Ser. No. 16/131,329 filed Sep. 14, 2018 by Nair and Brick, now issued as U.S. Pat. No. 10,942,300;

U.S. Ser. No. 16/131,351 filed Sep. 14, 2018 by Nair and Brick, now issued as U.S. Pat. No. 11,275,203;

U.S. Ser. No. 16/720,025 filed on Dec. 19, 2019 (U.S. Publication No. 2010189640) by Nair and Herrick, and entitled "Method for Preparing Laminate Precursor Rolls"; and U.S. Ser. No. 16/720,033 filed on Dec. 19, 2019 by Nair, and entitled "Method for Making Light-blocking Decorative Articles" now issued as U.S. Pat. No. 10,181,247, the disclosures of all of which are incorporated herein by reference.

FIELD OF THE INVENTION

This invention relates to the field of light-blocking materials. In particular, this invention relates to a method for making laminated light-blocking decorative articles having opacifying or light-blocking properties, which articles can be used as decorative drapes, shades, blinds, or other light-blocking materials. Such laminated light-blocking decorative articles can be prepared using a single-pass, in-line manufacturing operation by coating a non-woven fabric with an aqueous foamed opacifying composition, followed by drying, lamination to a decorative fabric, and densifying the resulting dry foamed opacifying layer. This invention also relates to laminated light-blocking decorative articles prepared using the noted method.

BACKGROUND OF THE INVENTION

In general, when light strikes a surface, some of it may be reflected, some absorbed, some scattered, and the rest transmitted. Reflection can be diffuse such as light reflecting off a rough surface like a white wall, in all directions, or specular, as in light reflecting off a mirror at a definite angle. A 100% opaque substance transmits almost no light, and therefore reflects, scatters, or absorbs all of it. Both mirrors and carbon black are opaque. Opacity depends on the selective absorption of the frequency of the light being considered. "Blackout" or light blocking materials typically refer to coated layers in articles that are substantially impermeable to light such as visible and UV radiation. Thus, when a blackout material such as a blackout curtain or blackout shade is hung over a window, it generally blocks substantially all external light from entering the room through that window. Blackout materials are suitable as curtains or shades for use in homes, for institutional use in hospitals and nursing homes and offices, as well as for use in commercial establishments such as hotels, theaters, and aircraft windows where the option of excluding light can be desirable.

Light blocking articles such as the blackout curtains can be comprised of a fabric (porous substrate) coated with several layers of a light-blocking composition. There is a need for these curtains, in addition to blocking transmitted light, to have a light color (hue) facing the environment to aid in illumination to minimize the amount of artificial lighting needed to perform the activity. An example is when the function of the blackout material is to separate two areas of activity where one or both areas can be artificially lit at the same time. More often than not, the function of a blackout curtain is to prevent sunlight from entering a room through a window. It can also be desirable for the color (hue) of the side facing the window to match the exterior décor of the building.

Light colored blackout coatings theoretically can be made by coating porous fabrics with light colored foams containing light scattering pigments such as titanium dioxide or clays. However, using only these pigments, very thick foam coatings will be needed to create blackout curtains through which the sun is not visible in a darkened room using. One method that is practiced for reducing the weight of such blackout materials is to sandwich a light-absorbing, foamed black or grey pigment, such as a carbon black between two foamed light scattering, white pigment-containing layers.

When an electromagnetic radiation blocking coating has, as it often does, a strongly light absorbing material containing black pigments such as carbon black, between two reflective layers, it has at least two distinct problems. First, such materials require three or more separate coating operations that reduce manufacturing productivity and increase unit costs. Secondly, carbon black in the light absorbing middle layer can become "fugitive" during sewing or handling as a result of some puncture or tear, and soil other layers such as the reflective layers, which is highly objectionable. Additionally, the stitches generated in the materials during sewing can cause the fugitive carbon black from the light absorbing layer to spread over a larger area thereby increasing the area of objectionable contamination of the light-colored surface.

U.S. Pat. No. 9,891,350 (Lofftus et al.) describes improved articles that are designed with an opacifying layer applied to a substrate and that are capable of blocking predetermined electromagnetic radiation.

An improvement in this art is described in U.S. Pat. No. 9,469,738 (Nair et al.) in which small amounts of porous particles containing small amounts of opacifying colorants can be incorporated into foamed compositions that have a foam density of at least 0.1 g/cm$^3$. Such foamed compositions can be applied to a substrate to provide opacification. U.S. Pat. No. 9,963,569 (Nair et al) describes similar technology for making opacifying element using a foamed aqueous latex composition.

U.S. Pat. No. 6,884,491 (Rubin et al.) describes water repellant, water resistant, and stain resistant fabrics that are prepared using treating compositions that are laminated to a backing polymeric film.

It is known to make decorative articles such as draperies using backing liners formed from woven or non-woven fabrics. A typical drapery can be a rectangular piece of decorative fabric whose edges are folded back and hemmed. A drapery made from a single layer of decorative textile fabric is less expensive than a lined drapery but it suffers from the difficulty that it is not fully opaque and that sunlight transmission can cause fading of dyes in the drapery as well in other articles or prevent desired darkening in a room which the drapery is hung. A lined drapery is generally constructed from a relatively high quality decorative fabric that can be printed, embossed, or otherwise carries a design, together with a lining that can be formed from a suitable less expensive woven or non-woven fabric. Such lining functions to reduce the transmission of light to impact the expensive decorative fabric. The lining can also add opacity to make it more difficult for outsiders to see into a room, and it may also provide insulative properties by trapping air between it and the decorative fabric. In addition, a lining can also add some weight to a drapery so that it hangs better.

However, lined draperies are more expensive not just because of additional material but because of fabrication costs to attach the lining to the decorative fabric.

A number of solutions have been proposed in the industry to reduce the costs and to achieve the advantages of linings, including the use of foamed linings or foamed adhesives between decorative fabrics and linings. A composite lining comprises a typical inexpensive woven or non-woven material useful as a backing material and a foamed organic polymer that functions as an adhesive for a decorative textile fabric, as described for example, in U.S. Pat. No. 3,748,217 (May et al.). The foamed organic polymer can be applied to a decorative fabric before the inexpensive woven or non-woven or material is laminated to the decorative textile fabric-adhesive combination, followed by curing.

Decorative blackout draperies are described in U.S. Pat. No. 5,741,582 (Lederman et al.) in which an opaque adhesive is applied to a textile material (first substrate) and a second material (second substrate) is then adhered thereto to provide a decorative drapery surface on one side and a lining on the opposing side of the opaque adhesive. The opposing materials can be formed from any suitable woven or non-woven textile composed of naturally-occurring or man-made fibers. The opaque adhesive can be provided as an acrylic foam containing a black or dark pigment, which acrylic foam is eventually crushed and cured once coated. Multiple adhesive layers can be used if desired, as applied to opposing first and second substrates. Unfortunately, the black or dark pigment in the opaque adhesive layer can show through both textiles that sandwich it and add discoloration to the fabric, unless outer layers of white foam are coated on either side of the black foam to hide that layer and minimize both coloration and fugitive black pigments such as carbon black. This becomes a multistep expensive process that could compromise the decorative fabric during the coating processes.

Decorative fabrics can also be prepared by providing opacifying compositions on their backside and then applying a flock to the opacifying composition for feel and appearance. However, many manufacturers and convertors are not happy with the use of flock because it can dust off the article during various down-stream treatments and become a product contaminant and an environmental health hazard for its flammability and human inhalation of particulate fibers. Moreover, it is hard to apply flock in a uniform manner unless it is applied using electrostatic means and apparatus, which is a very expensive operation. Thus, there is a need to avoid the use of flock if possible.

There is also a need for an improved and inexpensive means to provide light-blocking decorative articles in which flock is avoided but desired fabric feel is achieved on both faces of the article in a simplified, single-pass in-line process. There is also a need to avoid subjecting decorative fabrics to handling stresses during coating and drying processes while trying to achieve a light blocking article with the desired look and feel.

SUMMARY OF THE INVENTION

The present invention provides a method for making a laminated light-blocking decorative article in a single pass, the method comprising, in order:

A) providing a non-woven fabric having a face side and a back side;

B) applying an aqueous foamed opacifying composition to the back side of the non-woven fabric;

C) drying the applied aqueous foamed opacifying composition to provide a dry foamed opacifying layer having a dry coverage of less than or equal to 1000 g/m² and a light blocking value ($LBV_{oc}$) of at least 2;

D) providing a decorative fabric having a face side and a backside;

E) laminating the backside of the decorative fabric to the dry foamed opacifying layer; and F) simultaneously with E) or subsequently to E), densifying only or densifying and curing the dry foamed opacifying layer so that the dry foamed opacifying layer has a thickness that is at least 20% less than its thickness before densifying, to form a laminated light-blocking decorative article, wherein the aqueous foamed opacifying composition has at least 35% and up to and including 70% solids and a foam density of at least 0.1 g/cm³ and up to and including 0.5 g/cm³, and comprises:

(a) porous particles in an amount of at least 0.05 weight % and up to and including 20 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b) a binder material in an amount of at least 15 weight % and up to and including 70 weight %, (c) two or more additives in an amount of at least 0.0001 weight % and up to and including 30 weight %, the two or more additives comprising at least one foaming surfactant and at least one foam stabilizer, (d) an aqueous medium, and (e) an opacifying colorant in an amount of at least 0.0001 weight % and up to and including 0.5 weight %, the opacifying colorant being a different material from the (a) porous particles, (b) binder material, and (c) two or more additives, and which opacifying colorant absorbs electromagnetic radiation having a wavelength of at least 380 nm and up to and including 800 nm, all amounts of (a) porous particles, (b) binder material, (c) two or more additives, and (e) opacifying colorant being based on the total weight of the aqueous foamed opacifying composition.

This invention also provides a laminated light-blocking decorative article comprising:

a decorative fabric having a face side and a back side, a dry foamed layer, and a non-woven fabric having a face side and a back side, wherein the decorative fabric is laminated on its back side to the dry foamed opacifying layer that is disposed on the back side of the non-woven fabric, the dry foamed opacifying layer present at a dry coverage of less than or equal to 1000 g/m², and comprising:

(a) porous particles in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b) a matrix material that is derived from a (b) binder material, which matrix material is present in an amount of at least 10 weight % and up to and including 80 weight %, (c) two or more additives in an amount of at least 0.0001 weight % and up to and including 50 weight %, the two or more additives comprising at least one foaming surfactant and at least one foam stabilizer, (d) an aqueous medium in an amount of less than 5 weight %, and (e) an opacifying colorant in an amount of at least 0.002 weight % and up to and including 2 weight %, which opacifying colorant being a different material from the (a) porous particles, (b) binder material, and (c) two or more additives, and which opacifying colorant absorbs electromagnetic radiation having a wavelength of at least 380 nm and up to and including 800 nm, all amounts of (a) porous particles, (b) binder material, (c) two or more additives, and (e) opacifying colorant being based on the total weight of the dry foamed opacifying composition.

The present invention provides a method whereby a laminated light-blocking decorative article can be prepared in-line in a single-pass operation by bringing together a coated non-woven fabric and a decorative fabric in lamination. Before lamination, the back side of the non-woven fabric is coated with a single aqueous foamed opacifying composition having desired opacity and optionally adhesive properties, to provide a single dry foamed opacifying layer that can be adhered in-line to the decorative fabric to provide a laminated light blocking decorative article with the desired black-out, look, and feel properties. The present invention provides a simplified work flow where the decorative fabric is not subjected to coating and drying stresses and where the single-pass, in-line lamination avoids the extra steps of crushing and curing the coated non-woven fabric and storing of excess inventory. It can also avoid the need for a laminating adhesive by effecting crushing, curing, and lamination in a single step.

The non-woven fabrics used in this invention can be customized to have various features including printed images and colors.

Moreover, while flock and its problems are avoided, the resulting laminated light-blocking decorative articles are soft to the touch, and can be designed with any desired weight, stiffness (for example, for used as roller shades), or coloration while sufficiently blocking out impinging light. Decorative fabrics used in the manufacturing operation are spared from the risk and expense of stressful coating operations and multiple passes with stretching or tentering.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure can have broader use than is explicitly described or discussed for any particular embodiment.

Definitions

As used herein to define various components of the aqueous foamed opacifying composition or dry foamed opacifying layer, that is the (a) porous particles, (b) binder materials, (c) two or more additives, (e) opacifying colorant, and other materials used in the practice of this invention, and unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted as having a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

Unless otherwise indicated, the terms "dry foamed opacifying composition" and "dry foamed opacifying layer" are intended to refer to the same feature.

The terms "porous particle" and "porous particles" are used herein, unless otherwise indicated, to refer to porous bead-like polymeric materials useful in the aqueous foamed opacifying compositions essential for the present invention. As defined in detail below, the porous particles generally comprise a solid continuous polymeric phase having an external particle surface and discrete pores dispersed within the continuous polymeric phase. The continuous polymeric phase also can be chemically crosslinked or elastomeric in nature.

The continuous polymeric phase of the porous particles generally has the same chemical composition throughout that solid phase. That is, the continuous polymeric phase is generally uniform in chemical composition including any components [for example, (e) opacifying colorant] that can be incorporated therein. In addition, if mixtures of polymers compose the continuous polymeric phase, generally those mixtures also are uniformly distributed throughout.

As used in this disclosure, the term "isolated from each other" refers to the different (distinct) pores of the same or different sizes that are separated from each other by some portion of the continuous solid phase and such discrete pores are not interconnected. Thus, "discrete" pores refer to "individual" or "closed" non-connected pores or voids distributed within the continuous polymeric phase.

The (a) porous particles can include "micro," "meso," and "macro" discrete pores, which according to the International Union of Pure and Applied Chemistry, are the classifications recommended for discrete pore sizes of less than 2 nm, from 2 nm to and including 50 nm, and greater than 50 nm, respectively. Thus, while the (a) porous particles can include closed discrete pores of all sizes and shapes (that is, closed, non-interconnected discrete pores entirely within the continuous polymeric phase) providing a suitable volume in each discrete pore, macro discrete pores are particularly useful. While there can be open macro pores on the surface of the (a) porous particle, such open pores are not desirable for providing the advantages of the present invention, and may be present only by accident. The size of the (a) porous particles, their formulation, and manufacturing conditions are the primary controlling factors for discrete pore size. However, typically the discrete pores have an average size of at least 0.1 nm and up to and including 7,000 nm, or more likely at least 200 nm and up to and including 2,000 nm. Whatever the size of the discrete pores, they are generally distributed randomly throughout the continuous polymeric phase. However, if desired, the discrete pores can be grouped predominantly in one part (for example, in a "core" portion or in a "shell" portion) of the (a) porous particles.

Unless otherwise indicated, the term "non-porous" refers to particles that are not designed to have discrete pores or compartments within the solid continuous polymeric phase and less than 20% of their total volume consists of pores.

"Opacity" is a measured parameter of an opacifying element according to the present invention, which characterizes the extent to which the transmission of electromagnetic radiation such as visible light is blocked. A greater opacity indicates a more efficient blocking (hiding) of electromagnetic radiation or higher light-blocking for the dry foamed opacifying layer.

Glass transition temperature of the organic polymers used to prepare the continuous polymeric phase, or (b) binder materials described below, can be measured using Differential Scanning calorimetry (DSC) using known procedures. For many commercially available organic materials, the glass transition temperatures are known from suppliers.

The terms "decorative fabric" and "non-woven fabric" are defined below.

The term "fabric" is meant to refer to a material composed of or prepared from naturally occurring fibers, synthetic fibers, or a mixture of naturally occurring fibers and synthetic fibers of any desirable length.

Uses

The method according to this invention can provide a means for easily making a laminated light-blocking decorative article of a desired weight, stiffness, opacity, color, and feel. These laminated light-blocking decorative articles of this invention can have suitable light-blocking properties, feel, and color for use in various environments and structures. Such laminated light-blocking decorative articles of this invention may also exhibit improved sound and heat blocking properties. They can be used as, for example, draperies and other window treatments, room dividers, cubicle curtains, banners, labels, coverings and tarpaulins (for example for vehicles, boats, and other objects), and packaging materials. The laminated light-blocking decorative articles can optionally have one or more printable outer surfaces that are able to accept ink used in screen printing, gravure printing, inkjet printing, thermal imaging (such as "dye sublimation thermal transfer"), or other imaging processes. As decorative surfaces go, the laminated light-blocking decorative articles according to the present invention can have any type of decorative image, text, pattern, or combination thereof, as can be conceivably created by a person or machine.

For example, laminated light-blocking decorative articles can be a window shades having blackout, feel, optional coloration, and other properties desired by the customer.

Non-Woven Fabrics

Each non-woven fabric used in the practice of the present invention has two opposing sides, that is a face side and a back side. These two opposing sides can be the same or different in appearance, texture, feel, antimicrobial properties, or chemical composition, but the back side and face side labels are used to distinguish how the opacifying element is arranged in relation to the applied foamed opacifying composition and decorative fabric as described in the text below.

For example, the non-woven fabric can be composed of a blended or nonblended fabric, and can be considered as spunlaced non-woven fabrics (or tanglefaced non-woven fabrics). Spunlaced non-woven fabrics are generally textile fabrics consisting of fibers entangled in a predetermined pattern to form a strong, unbonded structure. Thus, such non-woven fabrics can be typically in the form of fabrics composed of fibers locked into place by fiber interaction, thereby providing a cohesive structure without the need for chemical binders or fiber fusing.

Useful non-woven fabrics can be formed from naturally-occurring fibers, synthetic fibers, or mixtures of naturally-occurring fibers and synthetic fibers. The commonly used fibers include naturally fibers such as cotton, ramie, silk, linen, jute, flax, wool, and blends of such naturally-occurring fibers; synthetic fibers such as nylon, polyester, polypropylene, polyamide, rayon, and blends of such synthetic materials; and special fibers such as glass, carbon, nanofiber, bi-component, and superabsorbent fibers. Polyester fibers are particularly useful, especially for spunlaced non-woven fabrics. In additions, blends of one or more naturally-occurring fibers and synthetic fibers can be used.

It is also possible that the non-woven fabrics are suitably tinted or colored using dyes or pigments that would be readily apparent to one skilled in this art in the fabric industry. Moreover, the non-woven fabrics can have one or more printed pattern or images on the face side, and such patterns or images can be provided before or after lamination to the decorative fabric.

Useful non-woven fabrics can be obtained from various industrial sources, and the processes for making them are well known including the teachings in U.S. Pat. No. 3,748,217 (noted above), the disclosure of which is incorporated herein by reference, especially with respect to the teaching in Cols. 3 and 4 and the references cited therein.

Useful non-woven fabrics can have a basis weight (or "fabric weight") of at least 0.5 oz/yd$^2$ (or 16.95 g/m$^2$), or at least 1 oz/yd (33.9 g/m$^2$). In other embodiments, the basis weight for non-woven fabrics used in this invention can up to and including 25 oz/yd$^2$ (or 847.7 g/m$^2$), or up to and including 12.5 oz/yd$^2$ (423.9 g/m$^2$).

Thus, in the practice of this invention, the various non-woven fabrics used in the practice of this invention can have the same or different color, stiffness, textile, feel, chemical composition, or other mechanical or chemical properties. This is one of the main advantages of the present invention in that the various non-woven fabrics can be different in any desired manner.

In many embodiments, the non-woven fabric can comprise a material that has been treated in one or more ways to provide water-repellency or stain resistance, or both, particularly on its face side. For example, such treatments can comprise applying a suitable fluorochemical treating agent, with or without a suitable antimicrobial agent (or biocide), to either or both of the face and back sides of a non-woven fabric material as well as to interstitial spaces within the non-woven fabric material, to provide a "treated" non-woven fabric, followed by suitable drying or curing at elevated temperatures. A representative treatment process is described in Cols. 4-6 of U.S. Pat. No. 6,884,491 (noted above) as well in Cols. 6ff of U.S. Pat. No. 6,541,138 (Bullock et al.), the disclosures of both of which are incorporated herein by reference. The treatment solutions can include one or more biocides (such as antimicrobials), crosslinking agents (including self-crosslinking latex polymers), soil releasing agents, fire retardants, smoke suppressants, dispersants, thickeners, dyes, pigments, UV light stabilizers, and other additives that would be readily apparent to one skilled in the art. Such treatments can be particularly useful on the face side of the non-woven fabric.

In general, suitable non-woven fabrics can have a dry average thickness of at least 50 μm, and the thickness can depend upon various industrial and customer factors. This dry average thickness can be determined when the non-woven fabric comprises less than 5 weight % water (based on the total weight of the non-woven fabric) using the average of at least 3 measurements taken at different places, or as determined using a suitable micrograph image.

Decorative Fabrics

Each decorative fabric used according to the present invention has two opposing sides, that is a face side (usually a viewable or observer's side) and a back side. These two opposing sides can be the same or different in appearance, texture, feel, color or composition, but the back side and face side labels are used to distinguish how the decorative fabric is arranged in relation to the non-woven fabric having its back coated with a dry foamed aqueous opacifying composition. The face side of such decorative fabrics can be any desired image, raised texture, "quilting", or embossed design, printing, and thus generally have a decorative function. Means for providing this decorative function are known in the art and include but are not limited to, decorative weaving, printing using dye sublimation, screen or digital printing, and inkjet printing. Thus, decorative fabrics are generally woven fabrics having decorative applied art and can be woven patterned, embossed, or printed. The ornamentation of such decorative fabrics can consist of repeated patterns and is achieved either by weaving, printing, or embroidering. For example, the decorative fabric can be a woven fabric having a repeating design pattern that is woven or embroidered into the decorative fabric.

A decorative fabric can be in the form of woven or non-woven materials that are composed of naturally-occurring fibers, synthetic fibers, or mixtures of naturally-occurring fibers and synthetic fibers. Suitable naturally-occurring fibers include but are not limited to, fibers of cotton, linen, ramie, silk, wool, and others known in the natural world, and blends of fibers of such naturally-occurring materials. Suitable synthetic fibers include but are not limited to, fibers of nylon, polyesters, acrylics, glass (fiberglass), polyurethanes, polyamides, polycarbonates, rayon, polyolefins, celluloses (include woven or non-woven paper materials), acetates, aromatic polyamides, polyvinyl chloride, and others known in the art, as well as combinations or blends of any of these types of fibers, such as polyvinyl chloride coated fibers of various materials. Useful fabrics also can be composed of polyvinyl chloride-clad polyester or polyvinyl chloride-clad fiberglass. Suitable fabric materials include but are not limited to, double cloth jacquards (that is fabrics manufactured on a jacquard loom), brocades, dobby fabrics, prints, poplins, cross-dyes, crepes, and canvasses.

In some embodiments, the decorative fabric is a porous fabric comprising a plurality of continuous yarn strands, all woven together, wherein each yarn strand comprises a multifilament core that is coated with a coating comprising a thermoplastic polymer. Further details for such decorative fabrics and their use are provided in U.S. Patent Application Publication 2018/0223474 (Nair et al.), the disclosure of which is incorporated herein by reference.

In many embodiments, the decorative fabric can comprise a material that has been treated in one or more ways to provide water-repellency or stain resistance, or both, on either or both face and back sides. For example, such treatments can comprise applying a suitable fluorochemical treating agent, with or without a suitable antimicrobial agent (or biocide), to the face side and back side of a decorative fabric material as well as to interstitial spaces within the decorative fabric material, to provide a "treated" decorative fabric, followed by suitable drying or curing at elevated temperatures. A representative treatment process is described in Cols. 4-6 of U.S. Pat. No. 6,884,491 (noted above) as well in Cols. 6ff of U.S. Pat. No. 6,541,138 (Bullock et al.), the disclosures of both of which are incorporated herein by reference. The treatment solutions can include one or more biocides (such as antimicrobials), crosslinking agents (including self-crosslinking latex polymers), soil releasing agents, fire retardants, smoke suppressants, dispersants, thickeners, dyes, pigments, UV light stabilizers, and other additives that would be readily apparent to one skilled in the art.

For example, a decorative fabric material can be treated with at least one or more biocidal agents capable of destroying or preventing the activity of bacteria, viruses, fungi, or mold, many of which materials are known in the art, including antibiotics, trialkyl tin compounds, copper compounds, copper complexes of dehydroabietyl amine or 8-hydroxyquinolinium 2-ethylhexoate, copper naphthenate, copper oleate, organosilicon quaternary ammonium compounds, silver metal and various silver salts.

One or more treatments of the decorative fabric material can be carried out to achieve the desired properties while maintaining desired hand, feel, texture, drape, and aesthetic appearance.

In general, suitable decorative fabrics can have a dry average thickness of at least 50 μm, and the thickness can depend upon the use of the laminated decorative article and the type of decorative fabric materials available for use. This dry average thickness can be determined when the decorative fabric comprises less than 5 weight % water (based on the total weight of the decorative fabric) using the average of at least 3 measurements taken at different places, or as determined using a suitable micrograph image.

The decorative fabric can also have an openness of at least 0% and up to and including 10%, or even at least 1% and up to and including 10%. "Openness" (Openness Factor, or OF) refers to how tight the weave is in a decorative fabric material, the percentage of holes in a fabric construction, and is sometimes referred to as "weave density." The lower the OF, the less the light transmittance and the greater the visible light that is obstructed or blocked. It is the ratio between transparent and opaque surfaces and depends on the spacing and dimension of the yarn.

Aqueous Foamed Opacifying Compositions

Each aqueous foamed opacifying composition comprises five essential components (a), (b), (c), (d), and (e) as defined below that are essential for providing desired properties in a dry foamed opacifying layer used in the method of this invention.

The aqueous foamed opacifying composition generally has at least 35% solids and up to and including 70% solids, or more particularly at least 40% solids and up to and including 60% solids.

(a) Porous Particles:

Porous particles used in the present invention containing discrete pores (or compartments or voids) are generally prepared using one or more water-in-oil emulsions in combination with an aqueous suspension process, such as in the Evaporative Limited Coalescence (ELC) process that is known in the art. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are incorporated herein by reference. Thus, the porous particles can be made by a multiple emulsion process that provides formation of individual porous particles comprising a continuous polymer phase and multiple discrete internal pores, and such individual porous particle is dispersed in an external aqueous phase. The described Evaporative Limited Coalescence (ELC) process is used to control the particle size and distribution while a hydrocolloid is incorporated to stabilize the inner emulsion of the multiple emulsions that provide the template for generating the discrete pores in the porous particles.

The (a) porous particles used in this invention generally have a porosity of at least 20 volume %, at least 35 volume %, or at least 40 volume %, and up to and including 60 volume %, up to and including 65 volume %, or up to and including 70 volume %, all based on the total porous particle volume. Porosity can be measured by an obvious modification of the known mercury intrusion technique. Except as noted below, the volume of each discrete pore is essentially full of air with perhaps some non-evaporated water present.

Thus, the (a) porous particles are generally polymeric and organic in nature (that is, the continuous polymeric phase is polymeric and organic in nature) and non-porous particles (having less than 20% porosity) are excluded from use in the present invention. Inorganic particles can be present on the outer surface of each porous particle if desired.

The (a) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning calorimetry.

The continuous polymeric phase can comprise one or more organic polymers having the properties noted above, in an amount of at least 70 weight % and up to and including 100 weight % based on the total polymer weight in the continuous polymeric phase. In some embodiments, the continuous polymeric phase is composed of one or more cellulose polymers (or cellulosic polymers) including but not limited to, those cellulosic polymers derived from one or more of cellulose acetate, cellulose butyrate, cellulose acetate butyrate, and cellulose acetate propionate. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures. Details about such polymers are provided, for example, in U.S. Pat. No. 9,963,569 (Nair et al.), the disclosure of which is incorporated herein by reference.

In other embodiments, the continuous polymeric phase can comprise one or more organic polymers such as polyesters, styrenic polymers (for example polystyrene and polychlorostyrene), mono-olefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Other useful polymers include polyurethanes, urethane acrylic copolymers, epoxy resins, silicone resins, polyamide resins, and polyesters of aromatic or aliphatic polycarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The polyesters can be saturated or unsaturated. Other useful polyesters include lactic acid polymers, glycolic acid polymers, caprolactone polymers, and hydroxybutyric acid polymers. Details of such useful polymers are provided, for example in U.S. Pat. No. 9,891,350 (Lofftus et al.) and U.S. Pat. No. 9,469,738 (Nair et al.), the disclosures of both of which are incorporated herein by reference.

The continuous polymeric binder of the (a) porous particles can also be derived from ethylenically unsaturated polymerizable monomers and polyfunctional reactive compounds as described for example in U.S. Pat. No. 8,703,834 (noted above), the disclosure of which is incorporated herein by reference.

In some embodiments, the continuous polymeric phase of the (a) porous particles comprises one or more cellulose polymers, a polyester, a polystyrene, or a combination thereof.

In general, the (a) porous particles used in the present invention have a mode particle size equal to or less than 50 µm, or of at least 2 µm and up to and including 50 µm, or typically of at least 3 µm and up to and including 30 µm or even up to and including 40 µm. Most useful (a) porous particles have a mode particle size of at least 3 µm and up to and including 20 µm. Mode particle size represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

Pore stabilizing materials such as hydrocolloids can be present within at least part of the volume of the discrete pores distributed throughout the continuous polymeric phase, which pore stabilizing materials are described in the Nair, Nair et al., and Putnam et al. patents cited above. For example, the pore stabilizing hydrocolloids can be selected from the group consisting of carboxymethyl cellulose (CMC), a gelatin or gelatin derivative, a protein or protein derivative, polyvinyl alcohol and its derivatives, a hydrophilic synthetic polymer, and a water-soluble microgel.

It can be desired in some embodiments to provide additional stability of one or more discrete pores in the (a) porous particles during their formation, by having one or more amphiphilic block copolymers disposed at the interface of the one or more discrete pores and the continuous polymeric phase. Such materials are "low HLB", meaning that they have an HLB (hydrophilic-lipophilic balance) value as it is calculated using known science, of 6 or less, or even 5 or less. The details of these amphiphilic polymers and their use in the preparation of the (a) porous particles are provided in U.S. Pat. No. 9,029,431 (Nair et al.), the disclosure of which is incorporated herein by reference. A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful including other polymeric emulsifiers such as GRINDSTED® PGPR 90, polyglycerol polyricinolate emulsifier, obtained from Danisco, Dupont.

Such an amphiphilic copolymer can be generally present in the (a) porous particles in an amount of at least 1 weight %, or at least 2 weight % and up to and including 50 weight %, based on total (a) porous particle dry weight.

The (a) porous particles used in this invention can be spherical or non-spherical depending upon the desired use. In a method used to prepare the (a) porous particles, additives (shape control agents) can be incorporated into the first or second aqueous phases, or in the oil (organic) phase to modify the shape, aspect ratio, or morphology of the (a) porous particles, using known technology.

The (a) porous particles can also comprise surface stabilizing agents, such as colloidal silica, on the outer surface in an amount of at least 0.1 weight %, based on the total dry weight of the (a) porous particle.

The average size of the discrete pores in the (a) porous particles is described above.

The (a) porous particles can be provided as powders, or as aqueous suspensions (including water or water with water-miscible organic solvents such as alcohols). Such powders and aqueous suspensions can also include surfactants or suspending agents to keep the (a) porous particles suspended or for rewetting them in an aqueous medium.

The (a) porous particles are generally present in a dry foamed opacifying composition in an amount of at least 0.1 weight % and up to and including 35 weight %, or typically at least 0.5 weight % and up to and including 25 weight %, or even at least 1 weight % and up to and including 20 weight %, based on the total weight of the dry foamed opacifying composition (including any residual aqueous medium), particularly when the (a) porous particles have a mode size of at least 3 µm and up to and including 20 µm.

In the dry foamed opacifying composition, the large mismatch in refractive index between the discrete pores of the (a) porous particles and the polymer walls (continuous polymeric phase), causes incident electromagnetic radiation passing through the dry foamed opacifying composition to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of (e) opacifying colorant is present in the (a) porous particles, for example either in the discrete pores or in the continuous polymer phase of the (a) porous particles, the opacifying power of the dry foamed opacifying composition is increased. This is because the multiple scattering of electromagnetic radiation in the dry foamed opacifying composition increases the path length of the electromagnetic radiation through it, thereby increasing the chance that the electromagnetic radiation will encounter the (e) opacifying colorant and be blocked or absorbed by it.

(b) Binder Materials:

The aqueous foamed opacifying composition also contains one or more (b) binder materials to hold the (a) porous particles, (c) two or more additives, and (e) opacifying colorant together on the non-woven fabric after the composition has been applied thereto. The one or more (b) binder materials can behave as a binding matrix for all the materials in such wet compositions, and can form a (b') matrix material to hold the (a) porous particles, (c) one or more additive, and (e) opacifying colorant(s) together in a dry foamed opacifying composition.

It is particularly useful that a (b) binder material have the following properties: (i) it is water-soluble or water-dispersible; (ii) it is capable of being disposed onto a suitable substrate as described below; (iii) it is capable of being dried and at least partially crosslinked (or at least partially cured); (iv) it has good light and heat stability; and (v) it is film-forming but contributes to the flexibility of the laminate precursor (and later laminated decorative article) and is thus not too brittle, for example generally having a glass transition temperature ($T_g$) of less than 25° C., or of less than 0° C., or of less than or equal to −10° C., or of less than or equal to −25° C., as determined using Differential Scanning calorimetry.

The choice of (b) binder materials can also be used to optimize a (b') matrix material in the dry formulation of all of the (a), (c), and (e) materials described herein, to provide desired properties. For example, the (b) binder material can be used to provide a (b') matrix material that adds to a supple feel to touch and a flexibility desired, for example, for hanging draperies. The (b') matrix material derived from the (b) binder material upon its at least partial and possibly, full curing or crosslinking.

The (b) binder material can include one or more organic polymers that are film forming and that can be provided as an emulsion, dispersion, or in an aqueous solution, and that cumulatively provide the properties noted above. It can also include one or more polymers that are self-crosslinking or self-curable, or it can include one or more polymers to which crosslinking agents are added and are thus curable or capable of being at least partially crosslinked under appropriate conditions.

For example, if the (b) binder material comprises a crosslinkable (or curable) polymer in the presence of a suitable crosslinking or curable agent or catalyst, such crosslinking (or curing) can be activated chemically with heat, radiation, or other known means. A curing or crosslinking process serves to provide improved insolubility of the resulting dry opacifying layer as well as cohesive strength and adhesion to the substrate. The curing or crosslinking agent is generally a chemical having functional groups capable of reacting with reactive sites in a (b) binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful (b) binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, and polyesters, silicone polymers or a combination of two or more of these organic polymers. Such (b) binder materials are readily available from various commercial sources or they can be prepared using known starting materials and synthetic conditions. The (b) binder material can be anionic, cationic or nonionic in total charge. A useful class of film-forming (b) materials includes aqueous latex polymer dispersions such as acrylic latexes that can be ionic or nonionic colloidal dispersions of acrylate polymers and copolymers. Useful film-forming aqueous latexes include styrene-butadiene latexes, poly(vinyl chloride) and poly (vinylidene chloride) latexes, poly(vinyl pyridine) latexes, poly(acrylonitrile) latexes, and latexes formed from acrylonitrile, butyl acrylate, and ethyl acrylate.

The one or more (b') matrix materials derived from one or more (b) binder materials, can be present in the dry foamed opacifying composition in an amount of at least 10 weight % and up to and including 80 weight %, or typically at least 20 weight % and up to and including 60 weight %, based on the total dry foamed opacifying composition (that is, the total weight of all components including any residual solvent).

It is useful that the dry weight ratio of the (a) porous particles to the (b') matrix material in the dry foamed opacifying composition is at least 2:3 and up to and including 9:1, and more likely at least 1:1 and up to and including 3:1.

(c) Two or More Additives:

The dry foamed opacifying composition used in the present invention can further include (c) two or more additives in an amount of at least 0.0001 weight % and up to and including 50 weight % and typically at least 1 weight % and up to and including 45 weight %, based on the total weight of the dry foamed opacifying composition (including any residual aqueous medium). These amounts refer to the total amounts of the (c) two or more additives, not to each additive individually.

Such (c) one or more additives include materials such as dispersants, foaming surfactants, foam stabilizers, plasticizers, fire retardants, biocides (such as fungicides and antimicrobials), preservatives, thickeners, pH buffers, thickeners, and inert inorganic and organic fillers that are not inorganic or organic pigments (colorants). The noted amounts refer to the total of all (c) two or more additives. There can be mixtures of each type of (c) two or more additives or mixtures of two or more types of (c) two or more additives in each dry opacifying layer. It is particularly useful in most dry foamed opacifying compositions to include at least one foaming surfactant and at least one foam stabilizer, and representative materials are defined below.

Such (c) two or more additives are different from the (e) opacifying colorants (described below) because individually or collectively, they will not substantially block or absorb incident electromagnetic radiation in the wavelength range of at least 380 nm and up to and including 800 nm, as determined in the manner described above for the (e) opacifying colorant.

Any of these (c) two or more additives thereof can be present within any location of the dry foamed opacifying composition, including but not limited to: the continuous polymeric phase of the (a) porous particles; a volume of some or all the discrete pores of the (a) porous particles; or both the volume of the discrete pores and the continuous polymeric phase of the (a) porous particles. Alternatively, such (c) two or more additives can be present in the (b) binder material alone, or in both the (b) binder material and in the (a) porous particles.

It would also be understood that while such (c) two or more additives can be in the dry foamed opacifying composition, and the same or different (c) two or more additives can be also present in the non-woven fabric or decorative fabric as described above.

The "inert" inorganic or organic fillers useful as (c) two or more additives are particles that can be added to reduce the amount of (b) binder materials. Such inert materials do not undergo a chemical reaction in the presence of water or other components in an aqueous foamed opacifying composition (described below); nor do they absorb electromagnetic radiation like the (e) opacifying colorants. Useful inert organic or inorganic filler materials include but are not limited to titanium dioxide, talc, clay (for example, kaolin), magnesium hydroxides, aluminum hydroxides, dolomite, glass beads, silica, mica, glass fibers, nano-fillers, calcium carbonate, and combinations thereof.

At least one of the (c) two or more additives is a surfactant that is defined as a compound that reduces surface tension in an aqueous formulation composition. In most embodiments, this essential surfactant is a foaming agent that functions to create and enhance foam formation. The (c) two more additives comprise one or more foaming agents as well as one or more foam stabilizing agents (or foam stabilizers) that are also surface active agents that function to structure and stabilize the foam. Examples of useful foaming agents (foaming surfactants) that are also surface-active agents, and foam stabilizers, include but are not limited to, ammonium stearate, ammonium palmitate, sodium lauryl sulfate, ammonium lauryl sulfate, ammonium or sodium alkyl sulfosuccinate, disodium stearyl sulfosuccinate, diammonium n-octadecyl sulfosuccinamate, ethoxylated alcohols, ionic or nonionic agents such as fatty acid soaps or a fatty acid condensation product with an alkaline oxide, for example, the condensation product of ethylene oxide with lauryl or oleic acid or an ester of fatty acids and similar materials, many of which can be obtained from various commercial sources. Mixtures of foaming agents can be used if desired, and mixtures of foam stabilizers can be used. Some of the noted compounds also act as foam stabilizers, but it best to use a separate foaming surfactant (agent) and a separate foam stabilizer together for synergistic effects of foaming and stabilization.

The relative amounts of each of the foaming surfactants and foam stabilizers is not critical as long as the desired functions are evident, that is suitable foaming properties as required to prepare an aqueous foamed opacifying composition, and stability of that aqueous foamed opacifying composition during storage and manufacture of the laminate precursors described herein. The optimal amounts of each of these (c) two or more additives can be determined by using routine experimentation and the teaching provided herein.

Useful biocides (that is, antimicrobial agents and antifungal agents) that can be present as (c) two or more additives and can include but are not limited to, silver particles, platelets, or fibrous strands, and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper particles, platelets, or fibrous strands and copper-containing compounds such as copper chelates and copper salts can be present as (c) two or more additives for biocidal purposes.

It can also be useful to include thickeners as (c) two or more additives in order to modify the viscosity of the aqueous foamed opacifying composition and to control its rheology.

In some embodiments, the (c) two or more additives further comprises one or more of an antimicrobial agent, a fire retardant, or both an antimicrobial agent and a fire retardant.

(d) Aqueous Medium:

Water is the predominant solvent used as an (d) aqueous medium in the aqueous foamed opacifying compositions. By "predominant" is meant that of the total weight of solvents in the (d) aqueous medium, water comprises at least 75 weight %, and more likely at least 80 weight % and up to and including 100 weight %, of the total solvent weight. Auxiliary solvents that can be present must not adversely affect or harm the other components in the aqueous formulation. Such auxiliary solvents can be water-miscible organic solvents such as alcohols and ketones.

(e) Opacifying Colorants:

The use of (e) opacifying colorants in a dry foamed opacifying composition is desirable to block or absorb incident electromagnetic radiation within the range of wavelengths of at least 380 nm and up to and including 800 nm. The (e) opacifying colorants can be water-soluble dyes or water-dispersible pigments, or combinations of each or both types of materials. The amount of electromagnetic radiation that can be blocked or absorbed by an (e) opacifying colorant can be determined by measuring opacity of an applied composition as described below. The (e) opacifying colorant can be a single colorant or a combination of materials that collectively act as the "opacifying colorant."

In many embodiments, the (e) opacifying colorant can be present within the (a) porous particles, for example, within a volume of at least some, if not all, discrete pores within the (a) porous particles or incorporated within the continuous polymeric binder of the (a) porous particles, or within both the volume of discrete pores and the continuous polymeric binder of the (a) porous particles. This is highly advantageous as the (a) porous particles can be used to "encapsulate" various (e) opacifying colorants as well as some or all of the (c) two or more additives (described below) so they are kept isolated from the other components of the dry foamed opacifying composition. For example, the (e) opacifying colorant can be located solely within the (a) porous particles. In other embodiments, it can be useful to incorporate (e) opacifying agents solely or additionally within the (b) binder material in which the (a) porous particles are dispersed.

While the (e) opacifying colorants can provide some coloration or desired hue, they are not purposely chosen for this purpose and are thus materials that are chosen to be different from the tinting colorants described above for the (c) two or more additives.

Examples of (e) opacifying colorants that can be used individually or in combination include but are not limited to, neutral or black pigments or dyes (other than a carbon black), carbon black, black iron oxide, graphite, aniline black, anthraquinone black, or combinations thereof, as well as combinations of colored pigments or dyes such as cyan, magenta, yellow, green, orange, blue, red and, violet dyes. The present invention is not limited to only the specific (e) opacifying colorants described herein but these are considered as suitable guidance for a skilled worker to devise other combinations of (e) opacifying colorants for the desired absorption in a chosen range of electromagnetic radiation. A carbon black or neutral or black pigment or dye other than a carbon black, of which there are many types available from commercial sources, is particularly useful as an (e) opacifying colorant.

The (e) opacifying colorant can be generally present in the dry aqueous foamed opacifying composition in an amount of at least 0.002 weight % and up to and including 2 weight %, or even at least 0.02 weight % and up to and including 1 weight %, all based on the total weight of the dry foamed opacifying composition (including any aqueous medium). As mixtures of the materials can be used if desired, these amounts also refer to the total amount of a mixture of materials used as the (e) opacifying colorant. As noted above, an (e) opacifying colorant can comprise a combination of two or more component materials (such as a combination of dyes or a combination of pigments) designed in hues and amounts so that the combination meets the desired black-out and coloration properties described herein.

In some embodiments, the (e) opacifying colorants, if in pigment form, are generally milled to a fine particle size and then encapsulated within the volume of the discrete pores of the (a) porous particles by incorporating the milled pigment within an aqueous phase used in making the (a) porous particles. Alternatively, the (e) opacifying colorant can be incorporated within the continuous polymeric phase of the (a) porous particles by incorporating the (e) opacifying colorant in the oil phase used in making the (a) porous particles. Such arrangements can be achieved during the manufacture of the (a) porous particles using the teaching provided herein and the teaching provided in references cited above for making the (a) porous particles.

In some embodiments, it can be useful to incorporate at least 95% (by weight) of the total (e) opacifying colorant within the volume of the (a) porous particles (either in the discrete pores, continuous polymeric phase, or both), and to incorporate the remainder, if any, within the (b) binder material. However, in many other embodiments, 100% of the (e) opacifying colorant is incorporated within the (a) porous particles. For example, more than 50% of the total (e) opacifying colorant can be disposed or incorporated within the continuous polymeric phase of the (a) porous particles, and the remainder can be incorporated within the volume of the discrete pores. Alternatively, all the (e) opacifying colorant can be incorporated into the volume of the discrete pores.

In all embodiments, the (e) opacifying colorants are different materials from the (a) porous particles, (b) binder materials, and (c) two or more additives described herein.

Aqueous Foamable Opacifying Compositions

The dry foamed opacifying compositions formed according to the present invention can be provided from corresponding aqueous foamed opacifying compositions that can be prepared using the materials and procedures described below.

The essential (a) through (e) components described above are generally present in an (d) aqueous medium in amounts different from the amounts defined above for the dry foamed opacifying layer. However, the relative percentages (proportions) of the (a) through (c) and (e) components in the aqueous foamed opacifying composition generally should be the same as in the dry foamed opacifying layer.

The amounts of the (a) through (e) components in the aqueous foamable opacifying composition and the aqueous foamed opacifying composition are essentially the same as foaming does not appreciably change the % solids or amounts of each components.

For example, the (a) porous particles (as described above) can be present in an aqueous foamed opacifying composition in an amount of at least 0.05 weight % and up to and including 20 weight %, or typically of at least 0.5 weight % and up to and including 15 weight %, all based on the total weight of the aqueous foamed opacifying composition. Such (a) porous particles generally have a mode particle size of at least 2 μm and up to and including 50 μm and a porosity of at least 20 volume % and up to and including 70 volume %.

One or more (b) binder materials (as described above) can be present in the aqueous foamed opacifying composition in an amount of at least 15 weight % and up to and including 70 weight % or typically of at least 30 weight % and up to and including 50 weight %, all based on the total weight of the aqueous foamed opacifying composition.

The (c) two or more additives (as described above) can be present in the aqueous foamed opacifying composition in an amount of at least 0.0001 weight % and up to and including 30 weight % or typically of at least 0.001 weight % and up to and including 20 weight %, all based on the total weight of the aqueous foamed opacifying composition. At least one of such (c) two or more additives is a foaming surfactant (as described above) and another is a foam stabilizer (as described above). These amounts refer to the total amounts of the (c) two or more additives, not to each additive individually.

The one or more (e) opacifying colorants (as described above) can be present in the aqueous foamed opacifying composition in an amount of at least 0.0001 weight % or at least 0.003 weight % and up to and including 0.5 weight %, or even in an amount of least 0.001 weight % and up to and including 0.3 weight % especially when the opacifying colorant is a carbon black, all based on the total weight of the aqueous foamed opacifying composition.

Water is the predominant solvent used in an (d) aqueous medium in the aqueous formulations. By "predominant" is meant that of the total weight of solvents in the (d) aqueous medium, water comprises at least 75 weight %, and more likely at least 80 weight % and up to and including 100 weight %, of the total solvent weight. Auxiliary solvents that can be present must not adversely affect or harm the other components in the aqueous formulation. Such auxiliary solvents can be water-miscible organic solvents such as alcohols and ketones.

The aqueous medium can comprise at least 30 weight % and up to and including 70 weight %, or typically at least 40 weight % and up to and including 60 weight %, of the total aqueous foamed opacifying composition weight. Or, the foamed aqueous All (a), (b), (c), and (e) components can be suitably mixed in an (d) aqueous medium by dispersing with a cowles blade. Representative time and temperature conditions for making such aqueous foamed opacifying compositions would be readily apparent to one skilled in the art.

Making Laminated Light-Blocking Decorative Articles

According to the present invention, a non-woven fabric having a face side and back side can be independently provided (step A) as described above. The face side is considered the side of the non-woven fabric that is viewable and left uncovered. A skilled worker can decide which "side" is best for application of the aqueous foamed opacifying composition. For example, the worker may choose the back side as the less aesthetically appealing side of the non-woven fabric and then the opposing side that has the nicer touch or color may be chosen as the face side.

The dry foamed opacifying layer typically comprises (a) porous particles, a (b') matrix material, (c) two or more additives, an (e) opacifying colorant, and possibly some residual (d) aqueous medium, all of which are described in more detail above.

Previously to or in combination with step A) according to the present invention, an aqueous foamed opacifying composition can be formed by appropriate foaming or aerating a corresponding aqueous foamable opacifying composition that has basically the same materials and component concentration.

Thus, the aqueous foamable opacifying composition can be aerated to provide an aqueous foamed opacifying composition having a foam density of at least 0.1 g/cm$^3$ and up to and including 0.5 g/cm$^3$, or of at least 0.15 g/cm$^3$ and up to and including 0.4 g/cm$^3$, or even of at least 0.15 g/cm$^3$ and up to and including 0.27 g/cm$^3$. This aeration procedure can be carried out using suitable conditions and equipment that would be readily apparent to one skilled in the art in order to create a "foam," for example in the presence of a foaming surfactant and foam stabilizer that are present at least in the (c) two or more additives described above. For example, aeration can be carried out by mechanically introducing air or an inert gas (such as nitrogen or argon) in a controlled manner. High shear mechanical aeration can be carried out using sonication or high-speed mixers, such as those equipped with a cowles blade, or with commercially available rotorstator mixers with interdigitated pins such as an Oakes mixer or a Hobart mixer, by introducing air under pressure or by drawing atmospheric air into the aqueous foamable opacifying composition with the whipping action of the mixer. Suitable foaming equipment can be used in a manner to provide the desired foam density with modest experimentation. It can be useful to chill or cool the aqueous foamable opacifying composition below ambient temperature to increase stability by increasing composition viscosity, and to prevent its collapse. This chilling operation can be carried out immediately before, immediately after, or during the aeration procedure. Stability of the resulting aqueous foamed opacifying composition can also be enhanced by the presence of a foam stabilizing agent as one of the (c) two or more additives.

Onto the back side of the non-woven fabric, an aqueous foamed opacifying composition described above can be applied (step B) to provide an applied coating or layer of that aqueous foamed opacifying composition. The wet coverage of the applied aqueous foamed opacifying compositions can be any desired amount, that upon drying, can provide a dry coverage as described below.

The aqueous foamed opacifying composition can be applied using a suitable application means and in any suitable manner. For example, the non-woven fabric can be coated with an aqueous foamed opacifying composition using a floating knife, hopper, blade, or gap coating apparatus and appropriate coating procedures including but not limited to blade coating, gap coating such as "knife-over-roll" and "knife-over-table" operation, floating knife, slot die coating, or slide hopper coating. For example, the aqueous foamed opacifying composition can be disposed directly onto a back side of the non-woven fabric wherein "directly" means there are no intervening or intermediate layers, or it can be disposed indirectly onto the back side of the non-woven fabric, meaning that an interlayer of some type (primer or adhesive layer) can be present.

The applied aqueous foamed opacifying composition can be dried (step C) to provide a dry coverage of less than or equal to 1000 g/m$^2$, and generally at least 50 g/m$^2$, or at least 100 g/m$^2$ and up to and including 500 g/m$^2$ of a dry foamed opacifying composition having a light blocking value (LBV$_{oc}$) of at least 2, or at least 3. In reference to a dry foamed opacifying layer, the term "dry" means that the layer comprises the aqueous medium (described below) in an amount of less than 5 weight %, or even less than 2 weight %, based on the total weight of the dry foamed opacifying layer. Drying operations to remove most or all of the aqueous medium can be achieved using suitable apparatus and treatments with heat or radiation that does not adversely affect the non-woven fabric and the aqueous foamed opacifying composition. For example, drying can be accomplished by heating with warm or hot air, microwaves, or IR irradiation at a temperature and time sufficient for drying (for example, at least 160° C.) to provide a dry foamed opacifying layer.

A decorative fabric having a face side and a back side is provided (step D) and its back side is brought into lamination contact (step E) with the dry foamed opacifying layer that has been applied and dried on the non-woven fabric. The E) laminating step includes at least partial and desirably sufficient curing of the dry foamed opacifying layer. This can be facilitated by the presence in the applied aqueous foamed opacifying composition of curable or crosslinkable polymers as (b) binder materials and appropriate catalysts to form the (b') matrix material. For example, a curing or crosslinking reaction can occur between reactive side groups of suitable curable polymer chains in a functionalized self-crosslinking latex composition to form (b') matrix material from the (b) binder material. If the chosen (b) binder material is not itself heat reactive, suitable catalysts and curing (crosslinking) agents can be added to promote curing or crosslinking.

One suitable technique for lamination includes the use of an optional adhesive material such as a thin intermediate heat seal or cold seal adhesive material between the decorative fabric back side and the dry foamed opacifying composition disposed on the non-woven fabric. In some embodiments, the adhesive material is incorporated within the dry foamed opacifying layer.

When using a heat seal adhesive, the non-woven fabric with the dry foamed opacifying composition can be supplied in web or sheet form in the manufacturing operation; the heat seal adhesive can be applied to one of the surfaces to be adhered; and then the back side of the decorative fabric is laminated thereto. Alternatively, or additionally, the heat seal adhesive can be supplied to the back side of the decorative fabric and the two articles are brought together during lamination. The heat seal adhesive also can be supplied (sprayed or squirted) between the two articles as they are brought together. The heat seal adhesive, after being heated, is then allowed to cool for example to room temperature, followed by lamination of the two articles.

Suitable adhesive materials are known in the art, and can comprise at least one polyamide, polyester, epoxy resin, acrylic resin, anhydride modified polyolefin, polyurethane, or blends of two or more types of polymers.

Other adhesive materials can be used in the present invention including but not limited to use of a layer of any cold seal or pressure-sensitive, photosensitive, or thermally-sensitive adhesive precursor material, followed by "activation" to create an adhesive layer using pressure, photoexposure, or thermal exposure, respectively. For example, liquid adhesives can be used including plastisol, epoxy, acrylic, organosol, and urethane adhesives that can be applied to either the dry foamed opacifying layer or the decorative fabric with a suitable coating technique (gravure cylinder, knife, roller, reverse roller, or anilox roller) under heat, followed by cooling to secure the adhesive bond.

It is also possible to laminate the dry foamed opacifying layer and the decorative fabric without the use of an intermediate adhesive layer. This can be done in any suitable manner known in the art using mechanical means without an adhesive means, using for example, direct calendar lamination to form a mechanical bond between the two articles. In direct calendar lamination, the two articles are brought together for example, under heat from appropriate sources (for example, individual supply rolls) and fed together into pressure rollers or a combination of calendar and embossing rollers to form the mechanical bonding upon cooling. The resulting laminated light-blocking decorative article can then be taken up into a roll or otherwise stored or immediately used in finishing operations.

Subsequent to or simultaneously with the E) laminating step, the dry foamed opacifying layer is densified (or crushed), in step F) so that it will have a thickness that is at least 20% less than its thickness before densifying in the resulting laminated light-blocking decorative article. Densification or crushing is a process of subjecting the dry foamed opacifying composition to mechanical pressure, to densify (reduce foamed volume) and to reduce layer thickness. This process can be carried out in any suitable manner but it is generally carried out by a process that provides pressure to the dry foamed opacifying layer in the intermediate "laminate", for example, by passing it through a compression calendering operation, pressing operation, or embossing operation, or a combination thereof. For example, the intermediate laminate can be pressed between flat plates or through nip rollers under pressure, or it can be passed through a combination of calendering and embossing rollers to reduce the thickness of the dry foamed opacifying layer and to densify the foam structure therein. This process can be considered a "densifying operation" as the dry foamed opacifying layer is made denser while it is pressed together. The thickness of the dry foamed opacifying layer before and after crushing (densifying) can be determined by a known technique such as laser profilometry.

The crushing or densifying operation can be carried out at any suitable temperature including room temperature (for example, 20-25° C.) and up to and including 150° C., or more likely at a temperature of at least 20° C. and up to and including 150° C., or at least 50° C. and up to and including 120° C. The crushing or densifying operation can be carried out at nip pressures that are suitable for the construction of the laminated light-blocking article including the openness factor to prevent over crushing and consequent loss of uniform opacity of the dry foamed opacifying layer. A useful crushing pressure can be determined using routine experimentation depending upon several factors including the dry foamed opacifying layer and type and weight of non-woven fabric used. For example, a useful crushing or densification pressure can be at least 5 psi (34.5 kPa) and up to and including 200 psi (1379 kPa).

Once densification is completed, each laminated light-blocking decorative article can be used immediately or stored for later additional finishing operations that would be readily apparent to one skilled in the art, some of which are described below.

Alternatively or additionally, the face side of the non-woven fabric can be modified with embossing or printing to provide a suitable image or pattern using known procedures such as inkjet printing or flexographic printing, thereby forming printed images of text, pictures, symbols, or combinations thereof. Such printed images can be visible, or they can invisible to the unaided eye (for example, using fluorescent dyes in the printed images). Alternatively, an outer surface can be covered by suitable means with a colorless continuous or discontinuous layer to provide a protective finish, or anti-microbial or soil release properties. In many instances, the image formed in this manner, for example, on an outer surface, is not visible or discernible from the other outer surface of the laminated light-blocking decorative article. In many instances, the image formed in this manner, for example, on one outer surface, is not visible or discernible from the other outer surface of the laminated light-blocking decorative article.

A thermally printed image can be formed on the face side of the non-woven fabric or on the face side of the decorative fabric, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches (areas) with or without a thermal colorless (clear) patch (area). Useful details of such a process are provided in U.S. Patent Application Publication 2018/0327965 (Herrick et al.), the disclosure of which is incorporated herein by reference.

In some embodiments, the laminated light-blocking decorative article prepared according to this invention can be a blackout drapery exhibiting a stiffness of less than 15 mN, as measured using a L&W bending force test and an L&W Bending Tester apparatus (Lorentzen and Wettre Products).

In other embodiments, a laminated light-blocking decorative article according to this invention can be a blackout shade fabric exhibiting a stiffness of at least 15 mN, as measured by L&W bending force test and apparatus noted above.

The present invention provides at least the following embodiments and combinations thereof, but other combinations of features are considered to be within the present invention as a skilled artisan would appreciate from the teaching of this disclosure:

1. A method for making a laminated light-blocking decorative article in a single pass, the method comprising, in order:

A) providing a non-woven fabric having a face side and a back side;

B) applying an aqueous foamed opacifying composition to the back side of the non-woven fabric;

C) drying the applied aqueous foamed opacifying composition to provide a dry foamed opacifying layer having a dry coverage of less than or equal to 1000 g/m² and a light blocking value ($LBV_{oc}$) of at least 2;

D) providing a decorative fabric having a face side and a backside;

E) laminating the backside of the decorative fabric to the dry foamed opacifying layer; and F) simultaneously with E) or subsequently to E), densifying only or densifying and curing, the dry foamed opacifying layer so that the dry foamed opacifying layer has a thickness that is at least 20% less than its thickness before densifying, to form a laminated light-blocking decorative article, wherein the aqueous foamed opacifying composition has at least 35% and up to and including 70% solids and a foam density of at least 0.1 g/cm³ and up to and including 0.5 g/cm³, and comprises:

(a) porous particles in an amount of at least 0.05 weight % and up to and including 20 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b) a binder material in an amount of at least 15 weight % and up to and including 70 weight %, (c) two or more additives in an amount of at least 0.0001 weight % and up to and including 30 weight %, the two or more additives comprising at least one foaming surfactant and at least one foam stabilizer, (d) an aqueous medium, and (e) an opacifying colorant in an amount of at least 0.0001 weight % and up to and including 0.5 weight %, the opacifying colorant being a different material from the (a) porous particles, (b) binder material, and (c) two or more additives, and which opacifying colorant absorbs electromagnetic radiation having a wavelength of at least 380 nm and up to and including 800 nm, all amounts of (a) porous particles, (b) binder material, (c) two or more additives, and (e) opacifying colorant being based on the total weight of the aqueous foamed opacifying composition.

2. The method of embodiment 1, wherein the dry foamed opacifying composition is subjected in the F) densifying step to a densification pressure of at least 5 psi (34.5 kPa) and up to and including 200 psi (1379 kPa) at a temperature of at least 20° C. and up to and including 150° C.

3. The method of embodiment 1 or 2, wherein the E) laminating step includes curing the dry foamed opacifying layer.

4. The method of any of embodiments 1 to 3, wherein the C) drying step includes curing the applied aqueous foamed opacifying composition.

5. The method of any of embodiments 1 to 4, further comprising:

before the A) providing step, forming the aqueous foamed opacifying composition by aerating an aqueous foamable opacifying composition to have the foam density of at least 0.1 g/cm³ and up to and including 0.5 g/cm³.

6. The method of embodiment 5, comprising aerating the aqueous foamable opacifying composition while it is chilled at a temperature below ambient temperature.

7. The method of any of embodiments 1 to 6, wherein the (e) opacifying colorant is present in the aqueous foamed opacifying composition in an amount of at least 0.001 weight % and up to and including 0.3 weight %, based on the total weight of the aqueous foamed opacifying composition.

8. The method of any of embodiments 1 to 7, wherein the (e) opacifying colorant is present in the aqueous foamed opacifying composition in an amount of at least 0.003 weight % and up to and including 0.5 weight %, based on the total weight of the aqueous foamed opacifying composition.

9. The method of any of embodiments 1 to 8, wherein the (e) opacifying colorant is present solely within the (a) porous particles.

10. The method of any of embodiments 1 to 9, wherein the aqueous foamed opacifying composition further comprises an adhesive material.

11. A laminated light-blocking decorative article comprising:

a decorative fabric having a face side and a back side, a dry foamed composition, and a non-woven fabric having a face side and a back side, wherein the decorative fabric is laminated on its back side to the dry foamed opacifying composition that is disposed on the back side of the non-woven fabric, the dry foamed opacifying composition present at a dry coverage of less than or equal to 10 ounces (mass)/yd², and comprising:

(a) porous particles in an amount of at least 0.1 weight % and up to and including 35 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;

(b) a matrix material that is derived from a (b) binder material, which matrix material is present in an amount of at least 10 weight % and up to and including 80 weight %, (c) two or more additives in an amount of at least 0.0001 weight % and up to and including 50 weight %, the two or more additives comprising at least one foaming surfactant and at least one foam stabilizer, (d) an aqueous medium in an amount of less than 5 weight %, and (e) an opacifying colorant in an amount of at least 0.002 weight % and up to and including 2 weight %, which opacifying colorant being a different material from the (a) porous particles, (b) binder material, and (c) two or more additives, and which opacifying colorant absorbs electromagnetic radiation having a wavelength of at least 380 nm and up to and including 800 nm, all amounts of (a) porous particles, (b) binder material, (c) two or more additives, and (e) opacifying colorant being based on the total weight of the dry foamed opacifying composition.

12. Any of embodiments 1 to 11, wherein the non-woven fabric is a blended or nonblended fabric.

13. Any of embodiments 1 to 12, wherein the non-woven fabric is a spunlace non-woven fabric.

14. Any of embodiments 1 to 13, wherein the non-woven fabric has a basis weight of at least 0.5 oz/yd² (16.95 g/m²).

15. Any of embodiments 1 to 14, wherein the non-woven fabric has a basis weight of up to and including 25 oz/yd² (847.7 g/m²).

16. Any of embodiments 1 to 15, wherein the non-woven fabric is colored.

17. Any of embodiments 1 to 16, wherein the decorative fabric is a woven fabric that is patterned, embossed, or printed.

18. Any of embodiments 1 to 17, wherein the decorative fabric is a woven fabric having a repeating design pattern that is woven or embroidered into the decorative fabric.

19. Any of embodiments 1 to 18, wherein the decorative fabric is a double cloth jacquard.

20. Any of embodiments 1 to 19, wherein the laminated decorative article is a blackout drapery exhibiting a stiffness of less than 15 mN, as measured by L&W bending force.

21. Any of embodiments 1 to 19, wherein the laminated decorative article is a blackout shade fabric exhibiting a stiffness as measured by L&W bending force of at least 15 mN.

22. Any of embodiments 1 to 21, wherein either the non-woven fabric or the decorative fabric, or both the non-woven fabric and the decorative fabric, comprise an antimicrobial agent, a fire retardant, or a soil release agent, or any combination thereof.

23. Any of embodiments 1 to 22, wherein the laminated decorative article is a window shade.

24. Any of embodiments 1 to 23, wherein the (e) opacifying colorant is a carbon black, a neutral or black pigment or dye other than a carbon black, or a combination of two or more of such materials.

25. Any of embodiments 1 to 24, wherein the (c) two or more additives further comprise one or more of an antimicrobial agent, a fire retardant, or both an antimicrobial agent and a fire retardant.

26. Any of embodiments 1 to 25, wherein the (c) two or more additives further comprise one or more of dispersants, plasticizers, optical brighteners, thickeners, biocides, tinting colorants, inert inorganic or organic fillers, or a combination of any of these materials.

27. Any of embodiments 1 to 26, wherein the (b) binder material has a glass transition temperature ($T_g$) of less than 25° C.

28. Any of embodiments 1 to 27, wherein the continuous polymeric phase of the (a) porous particles comprises one or more cellulose polymers, a polyester, a polystyrene, or a combination thereof.

29. Any of embodiments 1 to 28, wherein the (b) binder material comprises a crosslinkable material and a curing agent.

30. Any of embodiments 1 to 29, wherein the at least one foaming surfactant and the at least one foam stabilizer are independently one of the following compounds, or a mixture thereof: ammonium stearate, ammonium palmitate, sodium lauryl sulfate, ammonium lauryl sulfate, ammonium or sodium alkyl sulfosuccinate, disodium stearyl sulfosuccinate, diammonium n-octadecyl sulfosuccinamate, ethoxylated alcohols, a fatty acid soap, and a fatty acid condensation product with an alkylene oxide.

The invention has been described in detail with particular reference to certain preferred embodiments thereof, but it will be understood that variations and modifications can be achieved within the spirit and scope of the invention.

The invention claimed is:

1. A method for making a laminated light-blocking decorative article in a single pass, the method comprising, in order:
    A) providing a non-woven fabric having a face side and a back side;
    B) applying an aqueous foamed opacifying composition to the back side of the non-woven fabric;
    C) drying the applied aqueous foamed opacifying composition to provide a dry foamed opacifying layer having a dry coverage of less than or equal to 1000 g/m² and a light blocking value ($LBV_{oc}$) of at least 2;
    D) providing a decorative fabric having a face side and a backside;
    E) laminating the backside of the decorative fabric to the dry foamed opacifying layer; and
    F) simultaneously with E) or subsequently to E), densifying only or densifying and curing the dry foamed opacifying layer so that the dry foamed opacifying layer has a thickness that is at least 20% less than its thickness before densifying,
    to form a laminated light-blocking decorative article,
    wherein the aqueous foamed opacifying composition has at least 35% and up to and including 70% solids and a foam density of at least 0.1 g/cm³ and up to and including 0.5 g/cm³, and comprises:
    (a) porous particles in an amount of at least 0.05 weight % and up to and including 20 weight %, each porous particle comprising a continuous polymeric phase and discrete pores dispersed within the continuous polymeric phase, the porous particles having a mode particle size of at least 2 μm and up to and including 50 μm and a porosity of at least 20 volume % and up to and including 70 volume %;
    (b) a binder material in an amount of at least 15 weight % and up to and including 70 weight %,
    (c) two or more additives in an amount of at least 0.0001 weight % and up to and including 30 weight %, the two or more additives comprising at least one foaming surfactant and at least one foam stabilizer,
    (d) an aqueous medium, and
    (e) an opacifying colorant in an amount of at least 0.0001 weight % and up to and including 0.5 weight %, the opacifying colorant being a different material from the (a) porous particles, (b) binder material, and (c) two or more additives, and which opacifying colorant absorbs electromagnetic radiation having a wavelength of at least 380 nm and up to and including 800 nm,
    all amounts of (a) porous particles, (b) binder material, (c) two or more additives, and (e) opacifying colorant being based on the total weight of the aqueous foamed opacifying composition.

2. The method of claim 1, wherein the dry foamed opacifying layer is subjected in the F) densifying step to a densification pressure of at least 5 psi (34.5 kPa) and up to and including 200 psi (1379 kPa) at a temperature of at least 20° C. and up to and including 150° C.

3. The method of claim 1, wherein the E) laminating step includes curing the dry foamed opacifying layer.

4. The method of claim 1, wherein the C) drying step includes curing the applied aqueous foamed opacifying composition.

5. The method of claim 1, further comprising:
before the A) providing step, forming the aqueous foamed opacifying composition by aerating an aqueous foamable opacifying composition to have the foam density of at least 0.1 g/cm$^3$ and up to and including 0.5 g/cm$^3$.

6. The method of claim 1, wherein the non-woven fabric is a spunlace non-woven fabric.

7. The method of claim 1, wherein the non-woven fabric has a basis weight of at least 0.5 oz/yd$^2$ (16.95 g/m$^2$).

8. The method of claim 1, wherein the decorative fabric is a woven fabric having a repeating design pattern that is woven or embroidered into the decorative fabric.

9. The method of claim 1, wherein the decorative fabric is a double cloth jacquard.

10. The method of claim 1, wherein the laminated light-blocking decorative article is a blackout drapery exhibiting a stiffness of less than 15 mN, as measured by L&W bending force.

11. The method of claim 1, wherein the laminated light-blocking decorative article is a blackout shade fabric exhibiting a stiffness as measured by L&W bending force of at least 15 mN.

12. The method of claim 1, wherein either the non-woven fabric or the decorative fabric, or both the non-woven fabric and the decorative fabric, comprise an antimicrobial agent, a fire retardant, or a soil release agent, or any combination thereof.

13. The method of claim 1, wherein the (e) opacifying colorant is present in the aqueous foamed opacifying composition in an amount of at least 0.001 weight % and up to and including 0.3 weight %, based on the total weight of the aqueous foamed opacifying composition.

14. The method of claim 1, wherein the (e) opacifying colorant is a carbon black, a neutral or black pigment or dye other than a carbon black, or a combination of two or more of such materials.

15. The method of claim 1, wherein the (e) opacifying colorant is located solely within the (a) porous particles.

16. The method of claim 1, wherein the aqueous foamed opacifying composition further comprises an adhesive material.

17. The method of claim 1, wherein the (b) binder material has a glass transition temperature ($T_g$) of less than 25° C.

18. The method of claim 1, wherein the continuous polymeric phase of the (a) porous particles comprises one or more cellulose polymers, a polyester, a polystyrene, or a combination thereof.

19. The method of claim 1, wherein the at least one foaming surfactant and the at least one foam stabilizer are independently one of the following compounds, or a mixture thereof: ammonium stearate, ammonium palmitate, sodium lauryl sulfate, ammonium lauryl sulfate, ammonium or sodium alkyl sulfosuccinate, disodium stearyl sulfosuccinate, diammonium n-octadecyl sulfosuccinamate, ethoxylated alcohols, a fatty acid soap, and a fatty acid condensation product with an alkylene oxide.

* * * * *